March 21, 1939.   E. H. SWANSON   2,151,538
FILTER
Filed Sept. 22, 1937   2 Sheets-Sheet 1
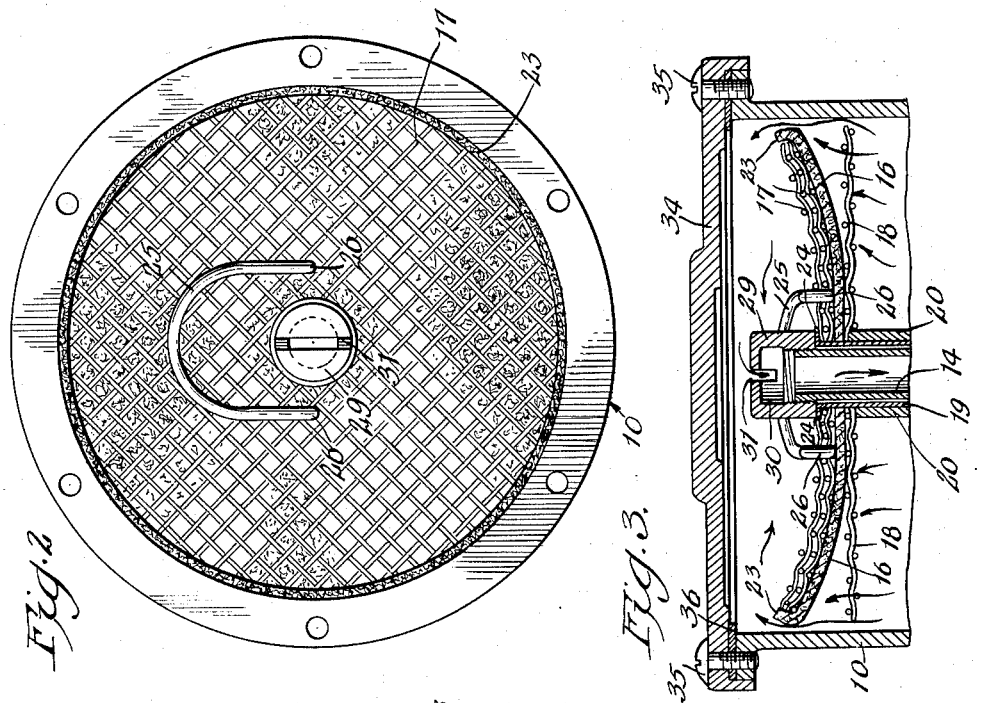
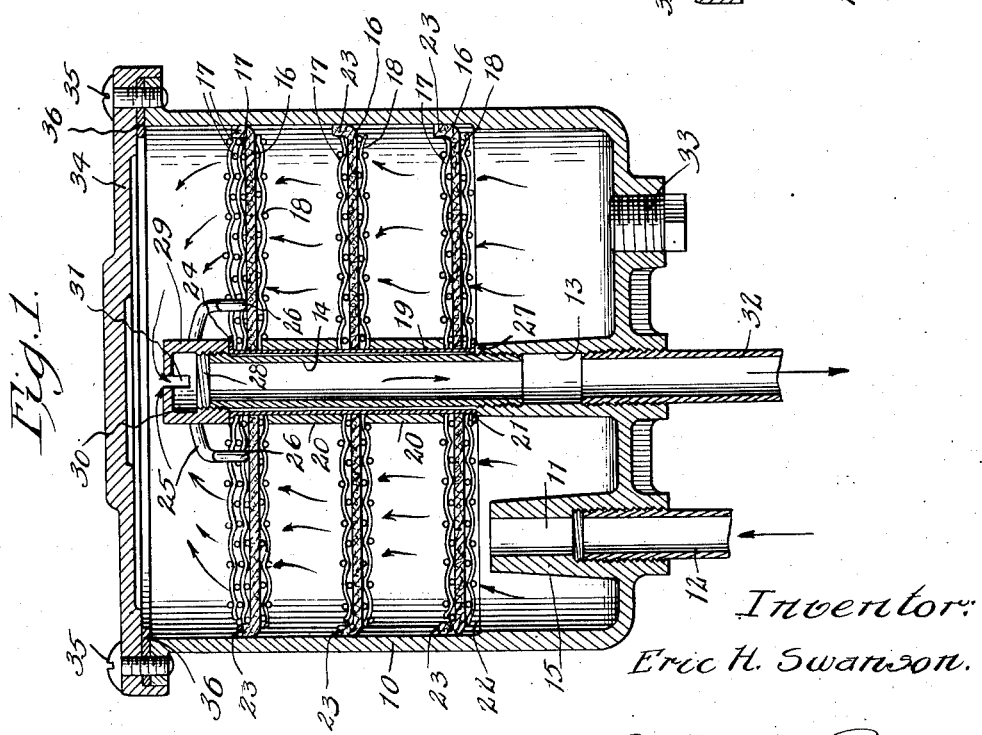
Inventor:
Eric H. Swanson.

March 21, 1939. E. H. SWANSON 2,151,538
FILTER
Filed Sept. 22, 1937 2 Sheets-Sheet 2
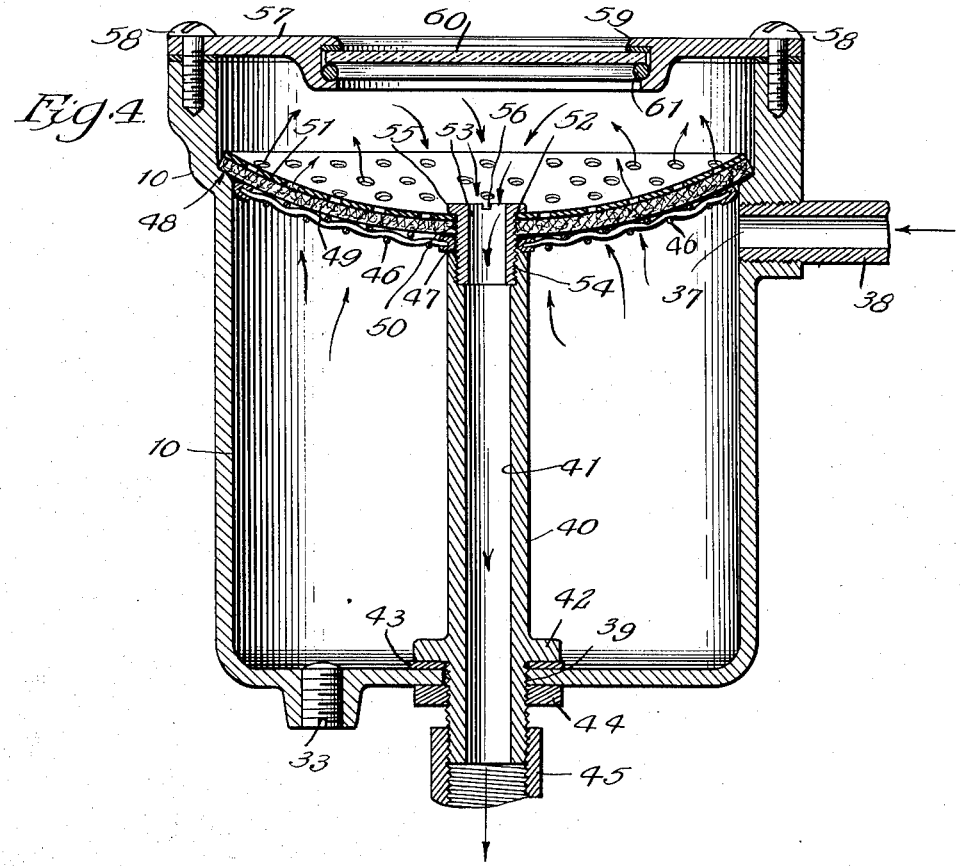
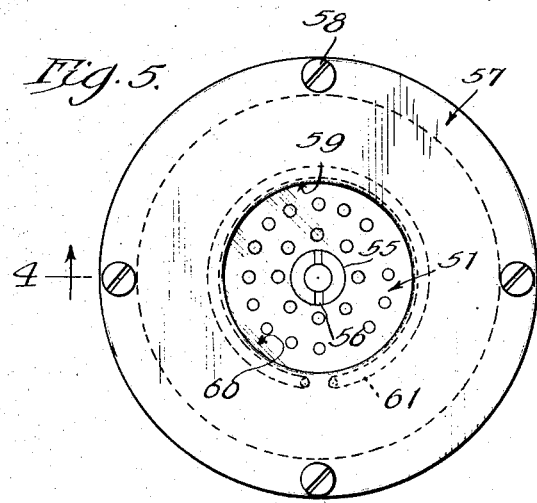
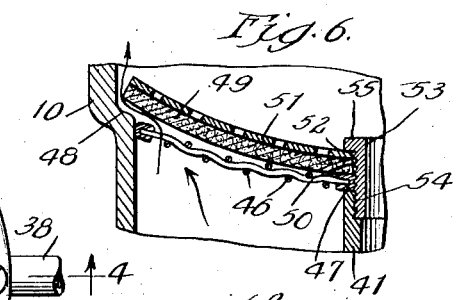
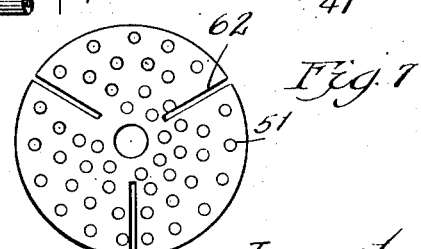
Inventor:
Eric H. Swanson Patented Mar. 21, 1939

2,151,538

UNITED STATES PATENT OFFICE 2,151,538

FILTER

Eric H. Swanson, Park Ridge, Ill.

Application September 22, 1937, Serial No. 165,160

5 Claims. (Cl. 210—165)

This application is a continuation, in part, of my application Serial Number 23,237 filed May 24, 1935.

This invention relates to filters, but more particularly to a filter adapted for use in the removal of foreign matter from lubricating oil, fuel oil, and the like.

The present invention is particularly well adapted for use in motor vehicles or the like, wherein a pressure system is employed for circulating fluid, such for example as lubricating oil, and for convenience in the present application the filter will be described in connection with such a system.

One of the objects of the invention is to provide a construction and arrangement wherein foreign matter may be efficiently filtered out of the oil, wherein a settling tank is provided for such foreign matter.

A further object is to provide novel supporting means for the filter material, and wherein efficient operation of the filter and lubricating system is assured.

A further object is to provide a structure wherein the operation of the device may be observed, and wherein the used filter material may be readily replaced or renewed.

A further object of the invention is to provide a structure wherein the filter material is retained in operative filtering position under normal conditions of the filter material and operation of the oil circulating system, and wherein the oil may still be circulated notwithstanding the clogging of the filter material to the extent of preventing the passage of oil therethrough.

To the attainment of these ends and the accomplishment of other new and useful objects as will appear, the invention consists in the features of novelty in the combination and arrangement of the several parts hereinafter more fully described and claimed and shown in the accompanying drawings, and in which Figure 1 is a vertical sectional view of a filter of this character constructed in accordance with the principles of this invention.

Figure 2 is a top plan view of Figure 1 with the cover removed, and showing only one resistor member.

Figure 3 is a detail sectional view, similar to Figure 1, of a portion of the filter showing the position the filtering material will assume under abnormal pressure of the fluid.

Figure 4 is a vertical sectional view taken on line 4—4 of a modified form of this invention and on an enlarged scale.

Figure 5 is a top plan view of Figure 4 on a reduced scale.

Figure 6 is a detail sectional view of a portion of the filter showing the position the filtering material will assume when acted upon by the fluid under abnormal pressure.

Figure 7 is a detail plan view on a reduced scale of one form of resistor plate which is associated with the filter material.

Referring to the form of the invention shown in Figures 1 to 3, and assuming that the present invention is employed in a pressure operated oil circulating system of a motor vehicle, the filter consists of an open-ended housing 10 of any desired size and configuration and constructed of any suitable material, being provided with an inlet port 11 adapted to receive a conduit or pipe 12 communicating with the supply pump of the lubricating system.

In the bottom of the housing 10, preferably adjacent the central portion thereof, is a discharge outlet opening which is preferably surrounded by a tubular projection 13 of any desired length, projecting into the housing, and connected to the projection 13 to form an extension thereof is a tubular member 14 of any suitable length but of a length to terminate short of the top of the housing and this tubular member may be secured to the projection 13 in any suitable manner, preferably by means of a screw connection.

A tubular projection 15 also preferably encompasses the inlet opening 11 and extends for any desired length into the housing, to terminate a substantial distance above the bottom of the housing.

The filter proper consists of a unit which may be readily inserted into and removed from the housing. The unit may consist of any desired number of separate filters each comprising a disc or body of filter material 16 and a resistor plate or member 17. If desired, an additional or supporting plate or element 18 may be provided on the opposite side of the material.

The filter element consists of a tubular member 19 of any desired material and of a sufficient length to permit the filter pads or elements 16 to be spaced from each other for the desired distance. Arranged between the adjacent filter elements is a tubular spacing member or collar 20 which also encompasses the central tubular member 19.

In assembling the filter unit, the lower end of the tubular member 19 is flanged as at 21 to form a support. Upon this support is arranged one of the supporting plates or elements 18 which is constructed of any suitable reticulated material either in the form of wire net or an apertured element. The diameter of the element 18 is slightly less than the internal diameter of the adjacent portion of the inner wall of the housing 10, and if desired, a circumferential shoulder 22 may be provided in the inner face of the housing adjacent which the peripheral edge of the lowermost filter pad or element 16 is disposed.

The element 18 is of sufficient rigidity so that in combination with the resistor element 17 the filter pad 16 will be normally held in a position to extend across the housing 10 with the peripheral edge thereof contacting the housing wall.

The diameter of the resistor 17 is less than the internal diameter of the housing so that the edge 23 of the filter element or pad 16 will be deflated and will stand within the space between the peripheral edge of the resistor 17 and the wall of the housing. The face of a substantial portion of the filter pad 16 will then contact with the housing wall and the resistor 17 and the supporting plate 18 will maintain the face of the outer edge of the filter pad against the wall of the housing so that any fluid delivered into the lower part of the housing 10 below the lowermost filter will be filtered through the pad, and under normal pressure the pad or filter element 16 will not be deflected.

Both the resistor 17 and the supporting plate 18 encompass the tube 19. The construction of each of these filter elements is the same and any number may be employed and superposed, according to the size of the filter and the number of filter elements desired. The lower filter element is supported by the flange 21 and the remaining elements are supported by the collars 20 encompassing the tubular member 19, these parts being secured together as a unit by flanging the other end of the tubular member 19 over the adjacent resistor plate or member 17, as at 24.

If desired, an additional resistor 17 may be employed wherever needed, and especially in connection with the uppermost end filter pad 16.

If desired and in order to form a means for removing and inserting the filter element from and into the housing 10, a suitable handle 25 may be provided. This handle may be in the form of a bail with the ends 26 thereof engaging a portion of the resistor elements 17. The handle is adapted to be folded down flat against the uppermost element when not in use, as shown in Figure 2.

The diameter of the filter pad 16 is substantially greater than the internal diameter of the housing 10, and when the unit is inserted into the housing, the peripheral edges of the filter elements 17 will be turned or deflated by the wall of the housing so as to stand within and fill the space between the peripheral edge of the resistor and the wall of the housing.

The tubular member 19 is telescoped over the extension 14 and the edge of the lowermost filter pad 16 will engage and rest upon the shoulder 22 in the housing wall, or if desired, the shoulder 22 may be so located that the lower edge of the tubular member 19 will engage and rest upon the end 27 of the tubular projection 13 which surrounds the outlet opening which leads from the housing. The upper end of the extension 14 is provided with threads 28 and a cap 29 is threaded thereupon. The lower end of the cap contacts the flange 24 on the tubular member 19 and cooperates with the shoulder 27 to clamp the filter unit in position.

The cap 29 is of a size that when in position a chamber 30 will be formed therein and a slot in the cap forms a communication between the interior of the housing 10 and the chamber 30 beyond the uppermost filter element so as to permit the filtered fluid to flow out of the housing through a discharge pipe 32 connected with the outlet opening.

A clean out plug 33 may, if desired, be provided in the wall of the housing.

The housing 10 may be closed by means of a suitable closure 34 secured in position by fastening bolts 35 and packing material 36 may be employed between the closure and the upper edge of the housing.

In the form of the invention shown in Figure 4, the housing 10 is provided with an inlet opening 37 preferably in the side and adjacent the upper portion thereof, and connected to this opening is an inlet pipe 38 which communicates with a supply pump of the lubricating system.

Formed in the bottom of the housing preferably adjacent the center thereof is an opening 39 adapted to receive a vertically disposed tubular member 40 having an opening 41 extending therethrough to provide an outlet for the oil from the housing, the member 40 being provided with an annular flange 42 adapted to engage a gasket 43 and to be snugly fitted against the gasket by a nut or collar 44 screw-threaded on to the outer end of the member 40 to provide a fluid tight connection, the outer end of the member 40 being adapted to receive a pipe or conduit 45 for conducting the oil to the various parts of the vehicle.

Mounted adjacent the upper end of the member 40 and intermediate the ends of the housing 10 in a manner to provide intake and discharge chambers therein adjacent the lower and upper portions thereof, respectively, is a filter element comprising in the present form of the invention a perforated or reticulated support 46 preferably of inverted cone or saucer-like form and, as shown in the present form of the invention, as a coarse wire fabric having an opening 47 adjacent the center thereof and with its outer marginal edge positioned adjacent the wall of the housing above the inlet opening 37 and preferably below a shoulder 48 formed on the inner wall of the housing. A filter pad 49 rests upon the support 46 and preferably conforms to the shape thereof, the pad being formed of any suitable fibrous material and is provided adjacent its central portion with an opening 50 adapted to register with the opening 47 in the support 46. The marginal edge of the pad 49 is adapted to be positioned and rest upon the shoulder 48 formed in the housing. Resting against the other face of the pad 49 is a perforated retainer or resistor 51 which is provided with a centrally located opening 52 adapted to register with the openings 50 and 47 formed in the pad 49 and the support 46, the resistor being formed preferably of thin resilient plate-like material of substantially inverted cone or saucer-like form to coincide substantially with the pad 49, the plate being sufficiently rigid to resist flexing under normal pressure in the system when the pad is comparatively clean and functioning properly but of sufficient resiliency to permit flexing of the outer marginal edge portions, as shown more clearly in Figure 6 and also in Figure 3, under excessive or abnormal pressure, as for example in the event that the filter pad becomes clogged with foreign matter during the operation of the filter.

A tubular bolt, or plug 53 is threaded into the upper end of the member 41, as at 54, and is provided with a flange 55 adapted to engage the resistor 51 and securely clamp the filter element to the end of the member 41, the bolt being provided with a slot 56 by means of which the bolt may be removed or secured in place.

For permitting convenient removal or replacement of the filter element, the open end portion of the housing 10 is provided with a removable closure 57 secured in position by means of screws or bolts 58. If desired and adjacent the central portion of the closure 57 there may be provided a sight opening 59 having a transparent closure 60 mounted thereon and held in place by means of a spring ring 61, thereby providing suitable means for conveniently observing the operation of the filter.

In both forms of the invention the lubricating oil under pressure enters the inlet opening on one side of the filter elements and the oil is forced through the supports on one side of the filter pad, thence through the filtering material and through the apertures or openings in the resistor by the normal pressure of the system, to the discharge chamber with which the discharge pipe has communication. The filtered oil then flows through the passage at the center of the filter elements to the discharge pipe from whence it is conducted to the parts to be lubricated.

The rigidity of the resistor is such that under normal operating conditions it will retain its normal shape and the normal shape of the filter pads. If, however, through continuous use, the filter material or pad becomes clogged with foreign matter to the extent of preventing the passage of oil therethrough, increased pressure in the system will develop sufficiently to flex or warp the marginal edge portions of the resistor and force the edge portions of the pad or filter material away from the shoulder 48, if the part rests upon such shoulder, or away from the wall to form a larger space to permit the oil to pass around the edge of the pad as indicated by the arrows in the different forms of the invention shown in Figures 3 and 6 respectively, thereby insuring a supply of oil to the bearings or other parts of the vehicle notwithstanding the clogged condition of the filter material or pad. This condition can be observed through the sight opening 59 in the cover and can be corrected by removing the cover and replacing the filter pads or unit.

When a plate is used as a resistor, such as plate 51 in the form of the invention shown in Figures 4 to 7, and in order to facilitate the flexing or yielding of the plate under relatively light pressures which may be employed in some lubricating systems, this resistor or plate may be provided with a plurality of radially disposed slots 62 extending inwardly from the marginal edge thereof.

It will be observed from the foregoing description that the present invention provides an efficient filtering device for lubricating oil or the like, and also insures adequate lubrication through the continued operation of the system notwithstanding the possible complete clogging of the filter pad or material due to continued use.

While the preferred forms of the invention have been herein shown and described, it is to be understood that various changes may be made in the details of construction, and in the combination and arrangement of the several parts, within the scope of the claims, without departing from the spirit of this invention.

What is claimed as new is:

1. In a filter, a housing having an inlet and an outlet, a filter element extending across the housing dividing the latter into an intake chamber and a discharge chamber, a resistor element on the discharge side of the filter and having openings therethrough, said resistor contacting one face of the filter element for a substantial area, a fixed anchor, and means securing said resistor and filter elements to said fixed anchor at a point within and spaced from the periphery of the elements, the periphery of the filter element being free for flexing movement, said element being adapted to resist flexing under normal fluid pressure, and to be flexed with respect to its point of anchorage under the influence of abnormal pressure.

2. A fluid filter embodying a housing having a fluid inlet, a flexible fibrous filter pad extending across and dividing the housing into an inlet and an outlet chamber, a resilient apertured resistor contacting the face of the pad on the discharge side thereof and being of a diameter less than the diameter of the pad, to provide a space between the periphery of the resistor and the housing wall, into which space the outer edge of the pad projects to substantially fill the space, means anchoring the pad and resistor at a point remote from the peripheries thereof, whereby under abnormal pressure the resistor will be flexed to permit passage of the fluid from the inlet chamber to the discharge chamber, and means providing a fluid outlet from the outlet chamber through the pad.

3. In a filter, the combination of a housing having fluid inlet and outlet passages, a flexible fibrous filter pad in said housing forming intake and discharge chambers respectively, and communicating respectively with said inlet and outlet passages, the periphery of the pad being unanchored and free for flexing movement, a resilient and apertured resistor adjacent the discharge side of said pad, and means anchoring said resistor at a point within and remote from the periphery thereof, said resistor adapted to yield with respect to its point of anchorage only under abnormal fluid pressure.

4. In a filter, the combination of a housing having an inlet passage, a tubular member extending thereinto and providing an outlet passage, a flexible fibrous filter pad having an opening therein in alinement with said tubular member, and a resilient perforated plate on the outlet side of said pad, said plate having an aperture in register with the opening in said pad and tubular member, and a tubular bolt for securing said pad and plate to said tubular member, said plate being adapted to resist flexing under normal pressure and to yield under the influence of abnormal pressure.

5. A filter embodying as a unitary structure a filter unit, said unit embodying a tubular member, and a plurality of filter elements encompassing and connected to said tubular member, spacers disposed between adjacent elements and also encompassing said tubular member, each of said elements embodying a filter pad, a flexible apertured resistor adjacent the face of the pad on the outlet side thereof, and an apertured supporting element adjacent the other face of the pad, an open housing having an inlet and a discharge outlet, said unit being insertable into and removable from the housing, the tubular member communicating with said outlet, means for removably securing the unit in the housing, and a closure for the housing, said supporting element of said pad being of a considerably smaller diameter than the interior of the housing to form a space between the housing wall and the periphery of said resistor, and said pad being of a greater diameter than the resistor and the interior of the housing, whereby the edge of the pad will, when the unit is in position, project into and fill the space between the periphery of the respective resistors and the housing wall, said resistors adapted to be flexed under abnormal pressure to permit the liquid to flow between the edge of the pad and the housing wall.

ERIC H. SWANSON.